(12) United States Patent
Wagner

(10) Patent No.: US 11,746,953 B2
(45) Date of Patent: *Sep. 5, 2023

(54) POWER FRAME AND LUBRICATION SYSTEM FOR A RECIPROCATING PUMP ASSEMBLY

(71) Applicant: SPM Oil & Gas Inc., Fort Worth, TX (US)

(72) Inventor: Bryan Wagner, Fort Worth, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/562,792

(22) Filed: Dec. 27, 2021

(65) Prior Publication Data

US 2022/0120382 A1  Apr. 21, 2022

Related U.S. Application Data

(63) Continuation of application No. 15/631,471, filed on Jun. 23, 2017, now Pat. No. 11,209,124.

(Continued)

(51) Int. Cl.
*F16N 13/02* (2006.01)
*F04B 1/053* (2020.01)
*F16N 13/04* (2006.01)
*F04B 47/00* (2006.01)
*F04B 53/16* (2006.01)

(Continued)

(52) U.S. Cl.
CPC ............. *F16N 13/02* (2013.01); *F04B 1/053* (2013.01); *F04B 23/02* (2013.01); *F04B 53/16* (2013.01); *F04B 53/18* (2013.01); *F04B 53/20* (2013.01); *F16N 13/04* (2013.01); *F04B 47/00* (2013.01)

(58) Field of Classification Search
CPC .......... F16N 13/02; F16N 13/04; F04B 47/00; F04B 1/053; F04B 23/04; F04B 17/06; F04B 53/18; E21B 43/26
See application file for complete search history.

(56) References Cited

U.S. PATENT DOCUMENTS 1,899,743 A * 2/1933 Berry ........................ F01L 5/02
123/196 V
1,973,063 A * 9/1934 Grier ....................... F04C 23/00
418/82

(Continued)

*Primary Examiner* — Michael R Mansen
*Assistant Examiner* — Mark K Buse

(57) ABSTRACT

An apparatus according to which a power end of a reciprocating pump assembly includes a block having bores formed therethrough, and crossheads disposed in the bores and adapted to reciprocate therein. A lubrication pump is in fluid communication with the bores. The pump is operable to pump lubrication fluid into each of the bores so that the crossheads are lubricated as they reciprocate within their respective bores. In another aspect, a power end includes a crosshead block and a power frame connected thereto, the frame including rib plates and supporting the crosshead block. In yet another aspect, a method includes casting a crosshead block; fabricating the rib plates; connecting the rib plates to form a frame; and connecting the cast crosshead block to the frame. In some embodiments, the power ends may be used in oilfield operations such as, for example, the cementing, acidizing, or fracturing of a subterranean wellbore.

20 Claims, 9 Drawing Sheets

Related U.S. Application Data

(60) Provisional application No. 62/353,824, filed on Jun. 23, 2016.

(51) Int. Cl.
*F04B 23/02* (2006.01)
*F04B 53/18* (2006.01)
*F04B 53/20* (2006.01)

(56) References Cited

U.S. PATENT DOCUMENTS

| | | | | |
|---|---|---|---|---|
| 2,812,720 A * | 11/1957 | Ellis | ............. | F04B 53/00 417/415 |
| 3,656,582 A * | 4/1972 | Alcock | ............. | F16J 1/08 123/196 R |
| 3,688,906 A * | 9/1972 | Ferrara | ............. | B04B 1/00 210/232 |
| 3,765,804 A * | 10/1973 | Brandon | ............. | F04B 11/00 417/540 |
| 3,987,750 A * | 10/1976 | Knapke | ............. | F16N 7/16 118/325 |
| 4,284,019 A * | 8/1981 | Marchesi | ............. | D05B 71/00 277/582 |
| 4,553,298 A * | 11/1985 | Grable | ............. | F04B 9/02 29/559 |
| 4,697,613 A * | 10/1987 | Wienck | ............. | F16K 17/30 55/358 |
| 4,831,277 A * | 5/1989 | Christopher | ............. | F02B 63/04 290/1 R |
| 5,247,873 A * | 9/1993 | Owens | ............. | F16J 1/22 403/135 |
| 5,476,154 A * | 12/1995 | Sage | ............. | F01M 11/0458 184/57 |
| 5,682,851 A * | 11/1997 | Breen | ............. | F01M 11/0458 123/196 A |
| 6,383,394 B1 * | 5/2002 | Briggs | ............. | B01J 20/261 210/671 |
| 6,596,174 B1 * | 7/2003 | Marcus | ............. | B67D 7/766 210/764 |
| 7,465,095 B2 * | 12/2008 | Agari | ............. | F16C 29/0611 384/13 |
| 8,182,246 B1 * | 5/2012 | Rohring | ............. | F04B 1/0413 417/63 |
| 8,215,022 B2 * | 7/2012 | Feizi | ............. | B26D 7/00 30/388 |
| 8,561,760 B2 * | 10/2013 | Yoshikawa | ......... | F16H 61/0021 184/7.3 |
| 8,707,853 B1 * | 4/2014 | Dille | ............. | F04B 39/0005 92/165 R |
| 9,879,659 B2 * | 1/2018 | Kumar | ............. | F16C 9/02 |
| 10,227,854 B2 * | 3/2019 | Glass | ............. | E21B 43/2607 |
| 11,209,124 B2 * | 12/2021 | Wagner | ............. | F04B 23/02 |
| 2002/0046905 A1 * | 4/2002 | Hulkkonen | ............. | D21G 1/022 184/6.1 |
| 2006/0207659 A1 * | 9/2006 | Shaefer | ............. | F04D 13/066 137/355.2 |
| 2006/0270566 A1 * | 11/2006 | Chambard | ............. | C10M 163/00 508/192 |
| 2007/0041849 A1 * | 2/2007 | Allen | ............. | F04B 49/126 417/273 |
| 2010/0172778 A1 * | 7/2010 | Kugelev | ............. | F04B 9/045 92/187 |
| 2010/0242720 A1 * | 9/2010 | Matzner | ............. | F16C 5/00 384/11 |
| 2010/0322802 A1 * | 12/2010 | Kugelev | ............. | F04B 53/147 29/888.021 |
| 2011/0080183 A1 * | 4/2011 | Hala | ............. | F04B 39/10 417/415 |
| 2012/0144995 A1 * | 6/2012 | Bayyouk | ............. | F04B 23/06 91/472 |
| 2012/0148430 A1 * | 6/2012 | Hubenschmidt | ...... | F04B 53/162 417/521 |
| 2012/0255734 A1 * | 10/2012 | Coli | ............. | E21B 43/26 166/305.1 |
| 2013/0195701 A1 * | 8/2013 | Skurdalsvold | ......... | F04B 53/16 417/521 |
| 2014/0147291 A1 * | 5/2014 | Burnette | ............. | F04B 53/006 417/364 |
| 2014/0174717 A1 * | 6/2014 | Broussard | ......... | E21B 43/2607 166/66.4 |
| 2014/0219824 A1 * | 8/2014 | Burnette | ............. | F04B 47/00 417/234 |
| 2014/0322050 A1 * | 10/2014 | Marette | ............. | F04B 49/22 417/437 |
| 2014/0348677 A1 * | 11/2014 | Moeller | ............. | F04B 39/1046 417/559 |
| 2014/0353450 A1 * | 12/2014 | Hart | ............. | F16M 3/00 248/346.6 |
| 2015/0252661 A1 * | 9/2015 | Glass | ............. | E21B 43/2607 166/308.1 |
| 2016/0025082 A1 * | 1/2016 | Byrne | ............. | F04B 53/162 29/888.03 |
| 2016/0025089 A1 * | 1/2016 | Kumar | ............. | F16C 35/067 92/161 |
| 2016/0208593 A1 * | 7/2016 | Coli | ............. | F04B 47/02 |
| 2016/0208797 A1 * | 7/2016 | Ladd | ............. | F04B 53/10 |
| 2018/0045331 A1 * | 2/2018 | Lopez | ............. | F17D 3/01 |
| 2019/0136840 A1 * | 5/2019 | Kumar | ............. | F04B 1/0404 |

* cited by examiner

POWER FRAME AND LUBRICATION SYSTEM FOR A RECIPROCATING PUMP ASSEMBLY

CROSS-REFERENCE TO RELATED APPLICATIONS

The present application is a continuation of U.S. patent application Ser. No. 15/631,471, filed on Jun. 23, 2017, which claims the benefit of the filing date of, and priority to, U.S. Patent Application No. 62/353,824, filed Jun. 23, 2016, the disclosures of which are hereby incorporated herein by reference.

TECHNICAL FIELD

The present disclosure relates generally to a reciprocating pump and, more specifically, to enhancing the performance, reliability, and/or capacity of the reciprocating pump by equipping the reciprocating pump with an improved power frame having an external, self-contained, integrated lubrication system.

BACKGROUND OF THE DISCLOSURE

Various pumps are used in connection with oilfield operations such as, for example, the cementing, acidizing, or fracturing of a subterranean wellbore. During such operations, these pumps are often subject to short and frequent duty cycles, and are required to deliver a fluid or slurry to the wellbore at pressures up to 20,000 psi. An example pump for oilfield operations is a reciprocating pump. The reciprocating pump may include a fluid end and a power end operably coupled thereto. The fluid end includes a number of pressure chambers that are in fluid communication with a suction manifold and a discharge manifold. The fluid end further includes plungers that are received by, and extend within, the respective pressure chambers. The power end includes a motor connected to a crank shaft. The crankshaft is coupled to respective ones of the plungers via a connecting rod, a crosshead, and a pony rod. The crossheads are disposed within crosshead bores, within which the crossheads are adapted to reciprocate. The connecting rods connect respective ones of the crossheads to the crankshaft, while the pony rods connect respective ones of the crossheads to the plungers. The motor drives the crankshaft, causing the crossheads to reciprocate within the corresponding crosshead bores and, consequently, causing the plungers to reciprocate within the corresponding pressure chambers. The power end includes a power frame that is adapted to support various components of the reciprocating pump such as, for example, the crankshaft and the crosshead bores. Time consuming and/or labor intensive efforts may be required to manufacture the power frame and the crosshead bores. Further, the performance of the reciprocating pump may be impaired by inefficient and/or unreliable delivery of lubrication fluid to the crosshead bores. Consequently, the crossheads are inadequately lubricated as they reciprocate within the crosshead bores. Therefore, what is needed is an apparatus or method that addresses one or more of the foregoing issues, and/or other issue(s).

SUMMARY

In a first aspect, the present disclosure introduces an apparatus that includes a power end of a reciprocating pump assembly, the power end including a block including a plurality of bores formed therethrough; and a plurality of crossheads disposed in the plurality of bores, respectively, and adapted to reciprocate therein; a skid on which the power end is mounted; a tank mounted on the skid and in fluid communication with each of the bores; and a pump in fluid communication with the tank and each of the bores; wherein the pump is operable to pump lubrication fluid from the tank and into each of the bores so that the crossheads are lubricated as they reciprocate within their respective bores.

In an embodiment, the skid is adapted to be mounted and/or transported on a trailer, but the tank and the pump are separate from, or independent of, the trailer so that the operation of the pump, namely to pump the lubrication fluid from the tank and into each of the bores so that the crossheads are lubricated as they reciprocate within their respective bores, is not dependent upon any pump lubrication feature of the trailer.

In an embodiment, the tank and the pump are external to the power end so that each of the tank and the pump is serviceable or replaceable without any interference to the power end.

In an embodiment, the crosshead block further includes a plurality of lubrication ports in fluid communication with the plurality of bores, respectively; and wherein the apparatus further includes a manifold connected to the power end, the manifold defining a fluid chamber in fluid communication with the pump, and also in fluid communication with the plurality of bores via at least the plurality of lubrication ports, respectively.

In an embodiment, the crosshead block further includes a plurality of drain ports in fluid communication with the plurality of bores, respectively; and wherein each of the drain ports is in fluid communication with the tank to permit the lubrication fluid to drain back into the tank.

In an embodiment, the apparatus includes a fluid return line via which the lubrication fluid drains back from the drain ports and into the tank, the lubrication fluid including a filter that is positioned external to the power end so that the filter is serviceable or replaceable without any interference to the power end.

In an embodiment, the skid includes a base member and a platform member spaced therefrom; and a region defined between the base member and the platform member spaced therefrom; wherein the power end is mounted on the platform member; and wherein the tank and the pump are disposed in the region.

In an embodiment, the apparatus includes the reciprocating pump assembly, which is mounted on the skid, the reciprocating pump assembly including the power end and a fluid end operably coupled thereto.

In an embodiment, the power end further includes a power frame to which the block is connected, the power frame including a plurality of parallel-spaced rib plates, each of the rib plates including a brace portion, each of the brace portions defining a contact surface; wherein the respective contact surfaces of the brace portions are coplanar; and wherein the block engages the coplanar contact surfaces.

In a second aspect, the present disclosure introduces an apparatus that includes a power end of a reciprocating pump assembly, the power end including a crosshead block including a plurality of bores formed therethrough; and a power frame connected to the crosshead block, the power frame including a plurality of rib plates spaced in a parallel relation and supporting the crosshead block.

In an embodiment, the crosshead block is cast to reduce weld joints in the power end, and wherein each of the rib plates is not cast but instead is fabricated.

In an embodiment, the power end includes a power housing connected to the power frame; a hollow pinion shaft, at least a portion of which is housed within the power housing; and first and second gear covers connected to respective opposing sides of the power housing; wherein each of the first and second gear covers is either stamped or hydroformed.

In an embodiment, each of the rib plates includes a plurality of openings formed therethrough; wherein the respective pluralities of openings are aligned with each other; wherein the power frame further includes a plurality of support rods, each of which is connected to each of the rib plates; and wherein each of the support rods extends through corresponding ones of the aligned openings formed through the rib plates.

In an embodiment, the power end includes a crankshaft that extends through the plurality of rib plates and is adapted to rotate; wherein each of the rib plates includes a central opening, which defines, or is part of, a rotational bearing that is adapted support the crankshaft as it rotates.

In an embodiment, each of the rib plates includes a brace portion, the brace portion defining a contact surface; wherein the respective contact surfaces of the brace portions are coplanar; and wherein the crosshead block engages the coplanar contact surfaces.

In an embodiment, the apparatus includes a skid on which the power end is mounted; a fluid end mounted on the skid and operably coupled to the power end; a tank mounted on the skid and in fluid communication with each of the bores of the crosshead block; and a pump mounted on the skid and in fluid communication with the tank and each of the bores of the crosshead block; wherein the pump is operable to pump lubrication fluid from the tank and into each of the bores of the crosshead block.

In a third aspect, the present disclosure introduces a method that includes casting a crosshead block of a power end of a reciprocating pump assembly; fabricating a plurality of rib plates; connecting the rib plates together to form a power frame; and connecting the cast crosshead block to the power frame.

In an embodiment, the method includes connecting a power housing to the power frame; and housing at least a portion of a hollow pinion shaft within the power housing.

In an embodiment, the method includes forming first and second gear covers, wherein each of the first and second gear covers is formed by either stamping or hydroforming; attaching the first and second gear covers to respective opposing sides of the power housing; and operably coupling a fluid end to the power end to form the reciprocating pump assembly.

In an embodiment, the method includes mounting the power end on a skid; and mounting a tank and a pump on the skid; wherein the tank is in fluid communication with the crosshead block; wherein the pump is in fluid communication with the tank and the crosshead block; and wherein the pump is operable to pump lubrication fluid from the tank and into the crosshead block.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Figure 1:
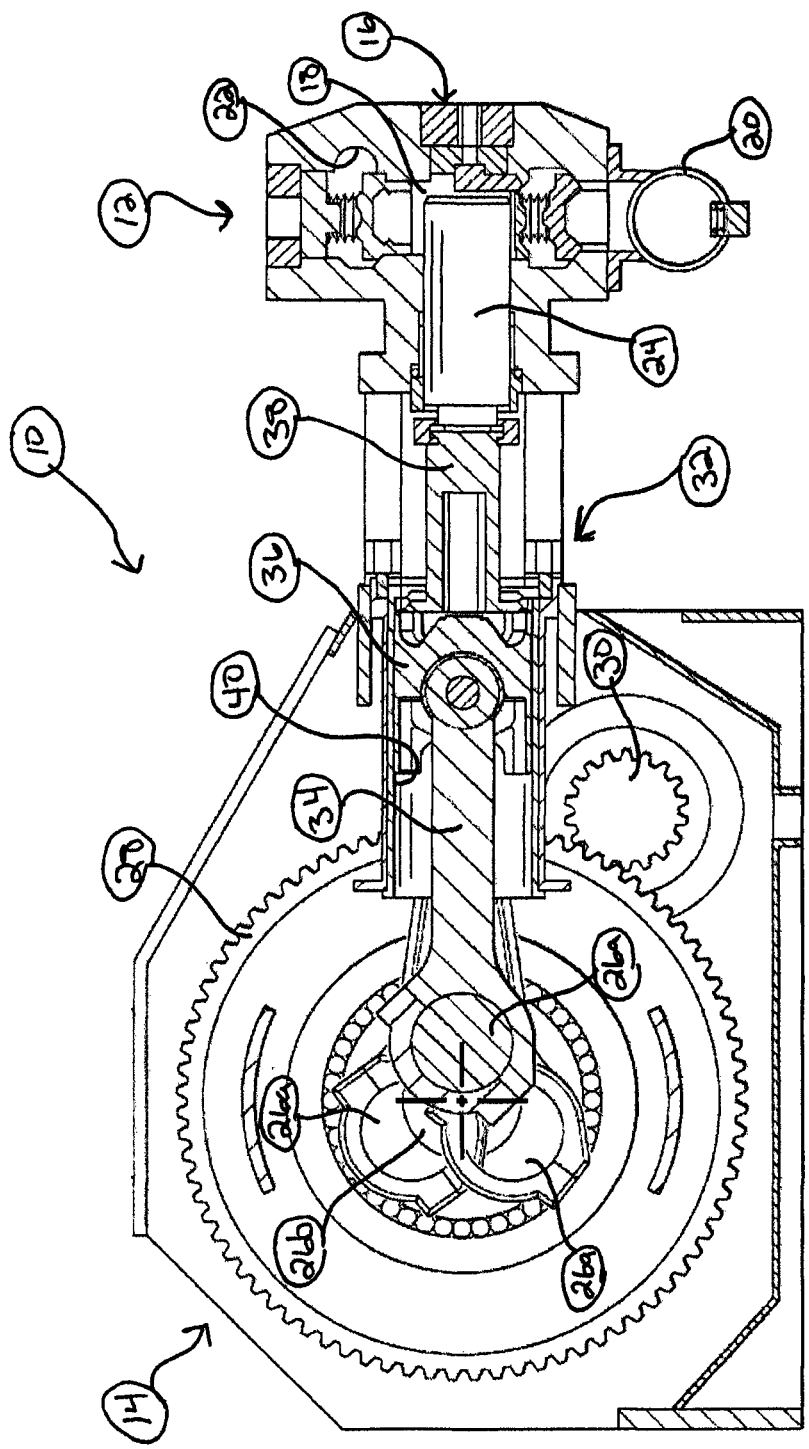
FIG. 1 is a sectional side view of a reciprocating pump assembly, the reciprocating pump assembly including a fluid end and a power end, according to an embodiment.

Referring to FIG. 1, a reciprocating pump assembly is schematically illustrated and generally designated by the reference numeral 10. The reciprocating pump assembly 10 includes a fluid end 12 and a power end 14 operably coupled thereto. The fluid end 12 of the reciprocating pump assembly 10 includes one or more cylinders 16, each of which includes a pressure chamber 18. In one embodiment, the reciprocating pump assembly 10 is a quintuplex pump, with the fluid end 12 including five of the cylinders 16. In other embodiments, the reciprocating pump assembly 10 may include any number of the cylinders 16 such as, for example, one cylinder, two cylinders (duplex pump), three cylinders (triplex pump), four cylinders (quadriplex pump), or more. The cylinders 16 and their respective pressure chambers 18 are spaced laterally across the fluid end 12. The pressure chambers 18 are each in fluid communication with a suction manifold 20 and a discharge manifold 22. The fluid end 12 further includes plungers 24 that are received by, and extend within, the respective pressure chambers 18. Each plunger 24 is adapted to reciprocate within the corresponding pressure chamber 18 during operation of the reciprocating pump assembly 10.

The power end 14 of the reciprocating pump assembly 10 includes a crankshaft 26 that includes one or more crank throws 26a, corresponding to the one or more cylinders 16 of the fluid end 12, and a main shaft 26b. The crank throws 26a are connected to the main shaft 26b and are each offset from the rotational axis of the crankshaft 26. The crankshaft 26 is mechanically coupled to a motor (not shown) via a bull gear 28 and a pinion 30. The bull gear 28 is attached to the crankshaft 26 and the pinion 30 is connected to the motor (not shown). The gear teeth of the bull gear 28 mesh with the gear teeth of the pinion 30, thereby transmitting torque therebetween. The crank throws 26a are each coupled to a respective one of the plungers 24 via a mechanical linkage 32, each of which includes a connecting rod 34, a crosshead 36, and a pony rod 38. Each of the crossheads 36 is disposed within a corresponding crosshead bore 40, within which the crosshead 36 is adapted to reciprocate. The connecting rods 34 connect respective ones of the crossheads 36 to respective ones of the crank throws 26a. Further, the pony rods 38 connect respective ones of the crossheads 36 to respective ones of the plungers 24.

In some embodiments, in operation, the motor (not shown) rotates the pinion 30, which, as a result, rotates the bull gear 28 and the crankshaft 26. The crankshaft 26 rotates the crank throws 26a about the central axis of the main shaft 26b. The crank throws 26a, in turn, are operable to drive the mechanical linkages 32, including respective ones of the connecting rods 34, the crossheads 36, and the pony rods 38, causing the crossheads 36 to reciprocate within the corresponding crosshead bores 40. The reciprocating motion of the crossheads 36 is transferred to respective ones of the plungers 24 via the pony rods 38, causing the plungers 24 to reciprocate within the corresponding pressure chambers 18. As the plungers 24 reciprocate within the respective pressure chambers 18, fluid is drawn into the pressure chambers 18 from the suction manifold 20 and, thereafter, discharged from the pressure chambers 18 into the discharge manifold 22.

Figure 2:
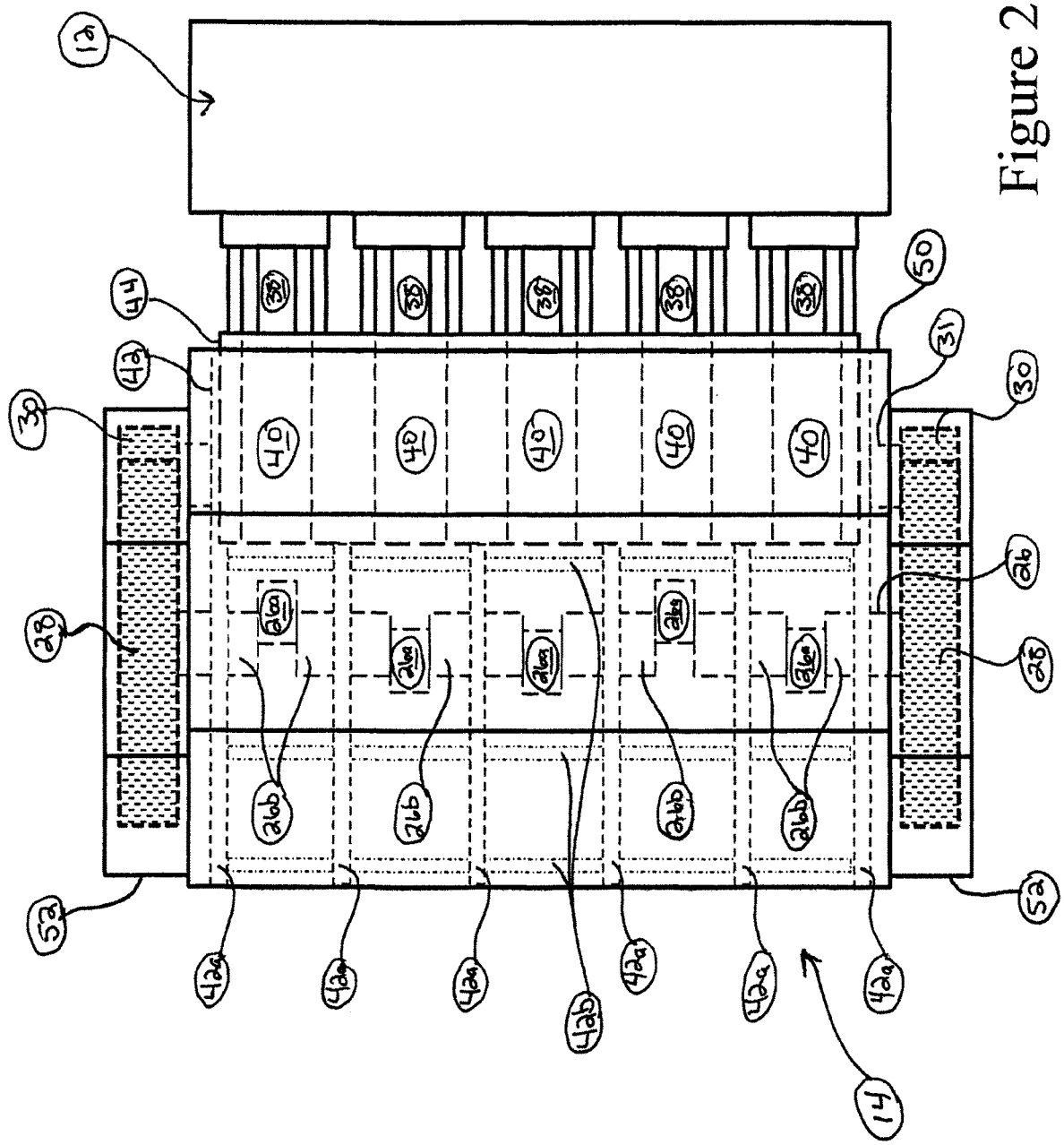
FIG. 2 is a diagrammatic top view of the reciprocating pump assembly of FIG. 1, according to an embodiment.
Figure 2A:
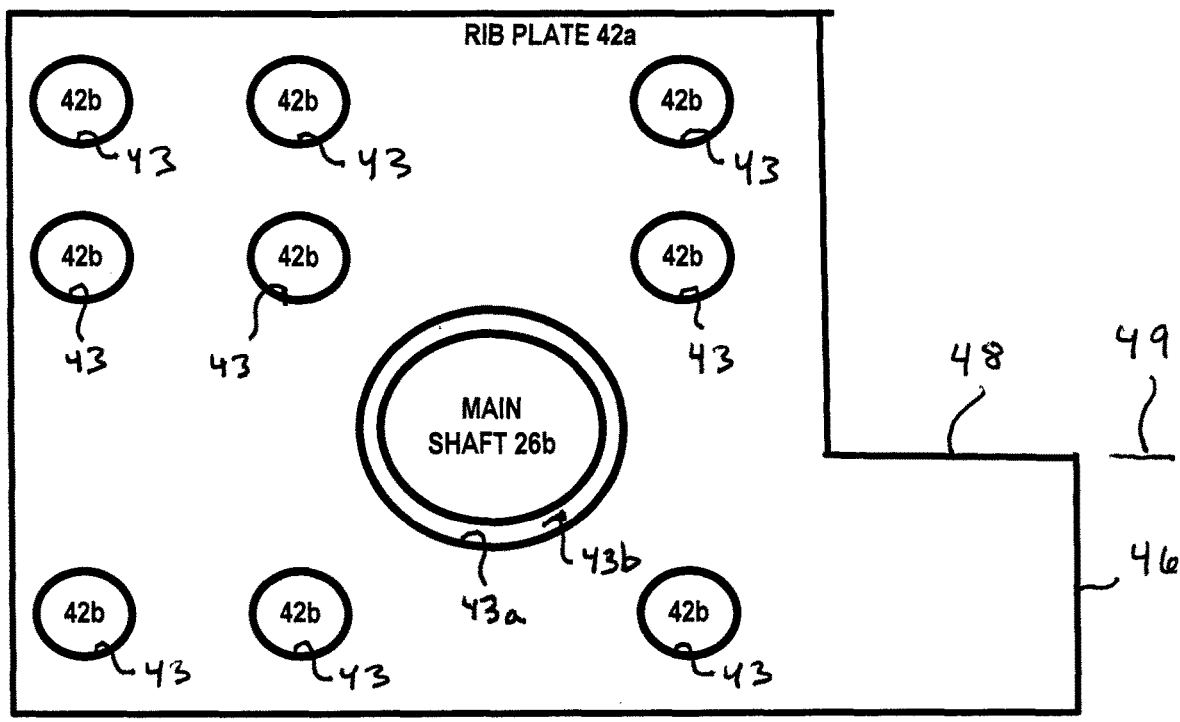
FIG. 2A is a diagrammatic side view of a rib plate of the power end of the reciprocating pump assembly of FIG. 2, according to an embodiment.
Figure 3:
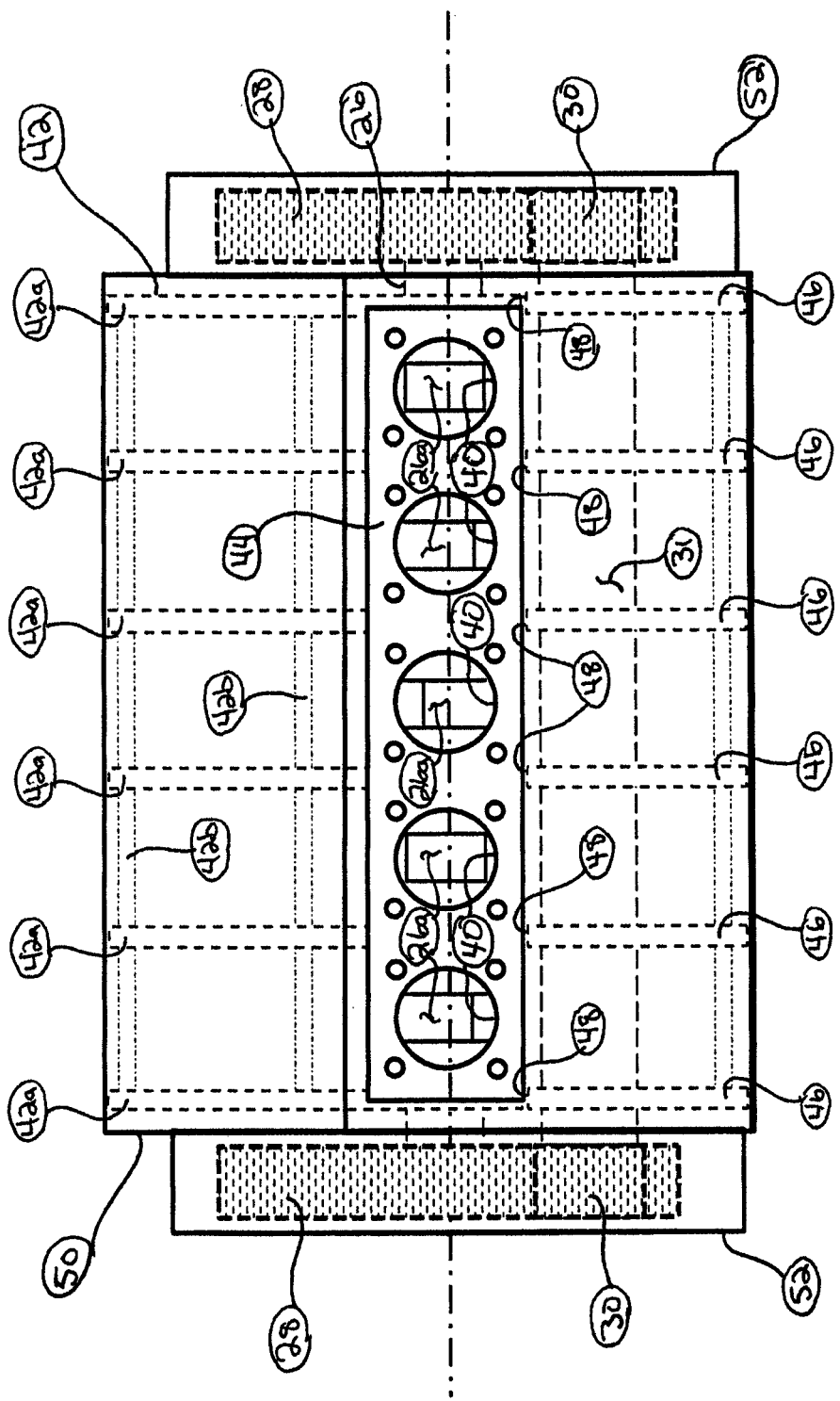
FIG. 3 is a diagrammatic front view of the power end of FIGS. 1 and 2, according to an embodiment.

Referring to FIGS. 2, 2A, and 3 with continuing reference to FIG. 1, the power end 14 of the reciprocating pump assembly 10 includes a power frame 42 and a crosshead block 44, which is connected to, and supported by, the power frame 42. The power frame 42 includes a plurality of parallel-spaced rib plates 42a and a plurality of support rods 42b. The rib plates 42a are spaced laterally across the power end 14 and are connected to one another by the support rods 42b, which extend between adjacent ones of the rib plates 42a. As shown most clearly in FIG. 2A, a plurality of openings 43 are formed through each of the rib plates 42a. The openings 43 formed through successive ones of the rib plates 42a are substantially aligned with one another and are adapted to accommodate respective ones of the support rods 42b. Accordingly, the support rods 42b extend laterally across the power end 14 and through corresponding ones of the aligned openings 43, extending through the rib plates 42a and connecting the rib plates 42a to one another. The support rods 42b may be connected to the rib plates 42a by using any one of a number of fabrication processes such as, for example, welding, brazing, soldering, another fabrication process, and/or any combination thereof. Additionally, in some embodiments, one or more of the support rods 42b may be a threaded rod, which is connected to respective ones of the rib plates 42a by threadably engaging a pair of fasteners (e.g., nuts, bushings, fittings, etc.) with the support rod 42b and tightening the fasteners against opposing sides of the rib plate 42a.

As shown in FIGS. 2, 2A, and 3, in some embodiments, the power end 14 may include nine support rods 42b, with each rib plate 42 including nine corresponding openings 43. In other embodiments, the power end 14 may include four, six, or another quantity of the support rods 42b.

The power frame 42 supports the crankshaft 26, the bull gear 28, and the pinion 30 during the operation of the reciprocating pump assembly 10. In one embodiment, as shown in FIG. 2A, each of the rib plates 42a includes a central opening 43a, which may support a respective portion of the crankshaft 26. Specifically, the central openings 43a, which are formed through successive ones of the rib plates 42a, may define, or be a part of, rotational bearings 43b, which support respective portions of the main shaft 26b, while the crank throws 26a are disposed laterally between the rib plates 42a. Further, the bull gear 28, which meshes with the pinion 30, is connected to an end portion of the main shaft 26b. The pinion 30, in turn, is connected to the motor (not shown). In some embodiments, the reciprocating pump assembly 10 includes two of the bull gears 28 (as shown in FIGS. 2 and 3), which are attached to opposing end portions of the main shaft 26b. As a result, the reciprocating pump assembly 10 also includes two pinions 30, which mesh with the respective bull gears 28 and are connected via a pinion shaft 31. The pinion shaft 31 is supported by the power frame 42 and extends laterally across the power end 14 between the pinions 30, thereby transferring torque between the pinions 30 and enabling the pinions 30 to mesh with the respective bull gears 28. In an embodiment, the pinion shaft 31 is hollow in order to reduce the overall mass of the reciprocating pump assembly 10.

In some embodiments, the crosshead block 44 is manufactured by casting, forming, and/or machining a solitary integral mass. During the manufacturing process, the crosshead bores 40 are formed through the crosshead block 44. As a result, the crosshead bores 40 are distributed across the crosshead block 44, which extends laterally across the power end 14 and is connected to, and supported by, the power frame 42. Specifically, the rib plates 42a each include a brace portion 46 that supports at least a portion of the crosshead block 44. The brace portions 46 each include a contact surface 48, which engages the crosshead block 44. In an embodiment, the contact surfaces 48 of the respective rib plates 42a are coplanar and thus substantially aligned with one another, thus defining a plane 49 upon which the crosshead block 44 is disposed. The crosshead block 44 is engaged with the contact surfaces 48, and is connected to the brace portions 46 at the contact surfaces 48. As a result, the brace portions 46 of the rib plates 42a support the crosshead block 44 in a fixed position relative to the crankshaft 26. Consequently, respective ones of the crosshead bores 40 are maintained in fixed positions that are substantially aligned with respective ones of the crank throws 26a.

With continuing reference to FIGS. 2, 2A, and 3, the reciprocating pump assembly 10 includes a power end housing 50 and a pair of gear covers 52. The power end housing 50 is made of a sheet material that extends about, and is connected to, the outer periphery of the power frame 42, thereby enclosing the power frame 42 and respective portions of the crankshaft 26, the pinion shaft 31, the mechanical linkages 32, and the crosshead block 44. The gear covers 52 are attached to respective opposing sides of the power end housing 50, thereby enclosing respective ones of the bull gears 28 and the pinions 30, including the respective end portions of the crankshaft 26 and the pinion shaft 31. In an embodiment, the gear covers 52 are formed by folding and welding a section of sheet material. In some embodiments, the gear covers 52 are formed by another manufacturing process such as, for example, hydroforming, stamping, casting, forming, machining, another manufacturing process, or any combination thereof. In some embodiments, the gear covers 52 are formed by stamping. In some embodiments, the gear covers 52 are formed by hydroforming. In some embodiments, the gear covers 52 are formed by either stamping or hydroforming.

Figure 3A:
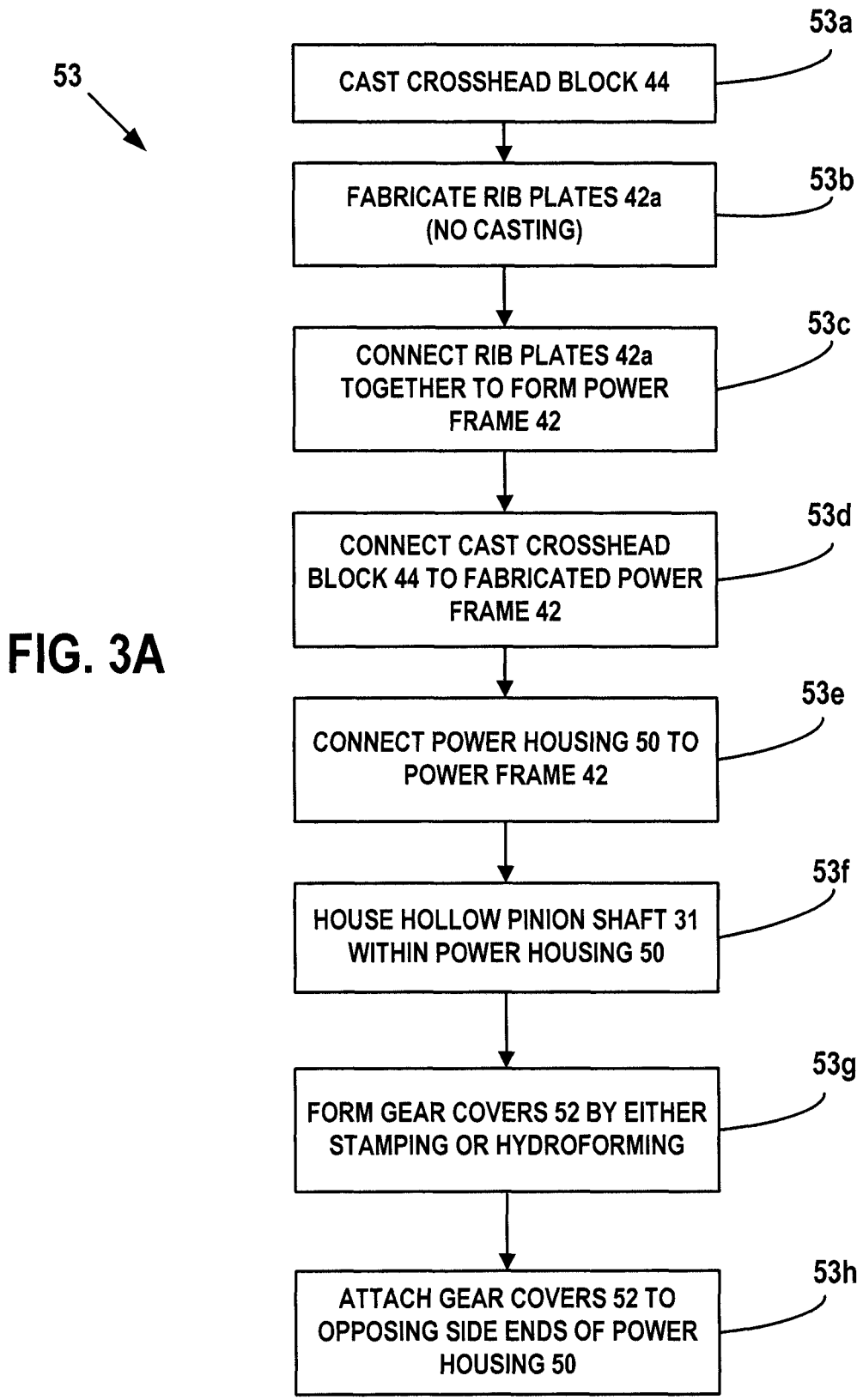
FIG. 3A is a flow chart illustration of a method of manufacturing the power end of FIGS. 1-3, according to an embodiment.

Referring to FIG. 3A with continuing reference to FIGS. 1, 2, 2A, and 3, a method of manufacturing the power end 14 is generally referred to by the reference numeral 53 and includes a step 53a, at which the crosshead block 44 is cast.

At step 53b, each of the rib plates 42a is not cast but instead is fabricated by, for example, cutting, assembling, welding, bending, etc. one or more metal pieces to fabricate the rib plates 42a and/or respective portions thereof. At step 53c, the rib plates 42a are connected together using the support rods 42b to form the power frame 42, in accordance with the foregoing. At step 53d, the crosshead block 44 is connected to the power frame 42, in accordance with the foregoing. At step 53e, the power housing 50 is connected to the power frame 42. At step 53f, the pinion shaft 31 is a hollow pinion shaft, and at least a portion of the pinion shaft 31 is housed within the power housing 50. At step 53g, the gear covers 52 are formed by either stamping or hydroforming. At step 53h, the gear covers 52 are attached to opposing sides of the power housing 50.

In some embodiments, casting the crosshead block 44 at the step 53a reduces the quantity of weld joints in the power end 14; since in many cases structural failures occur at weld joints, reducing the number of weld joints, by casting the crosshead block 44, reduces the risk of structural failure in the power end 14. In some embodiments, the step 53f reduces the overall mass or weight of the power end 14. In some embodiments, the step 53g reduces the weight of the power end 14, and also reduces the cost of the power end 14 with respect to material costs and labor costs; since at the step 53g the gear covers 52 are either stamped or hydroformed, the costs associated with manufacturing processes such as folding, bending, and welding metal for the covers 52 are either eliminated or significantly reduced.

Figure 4:
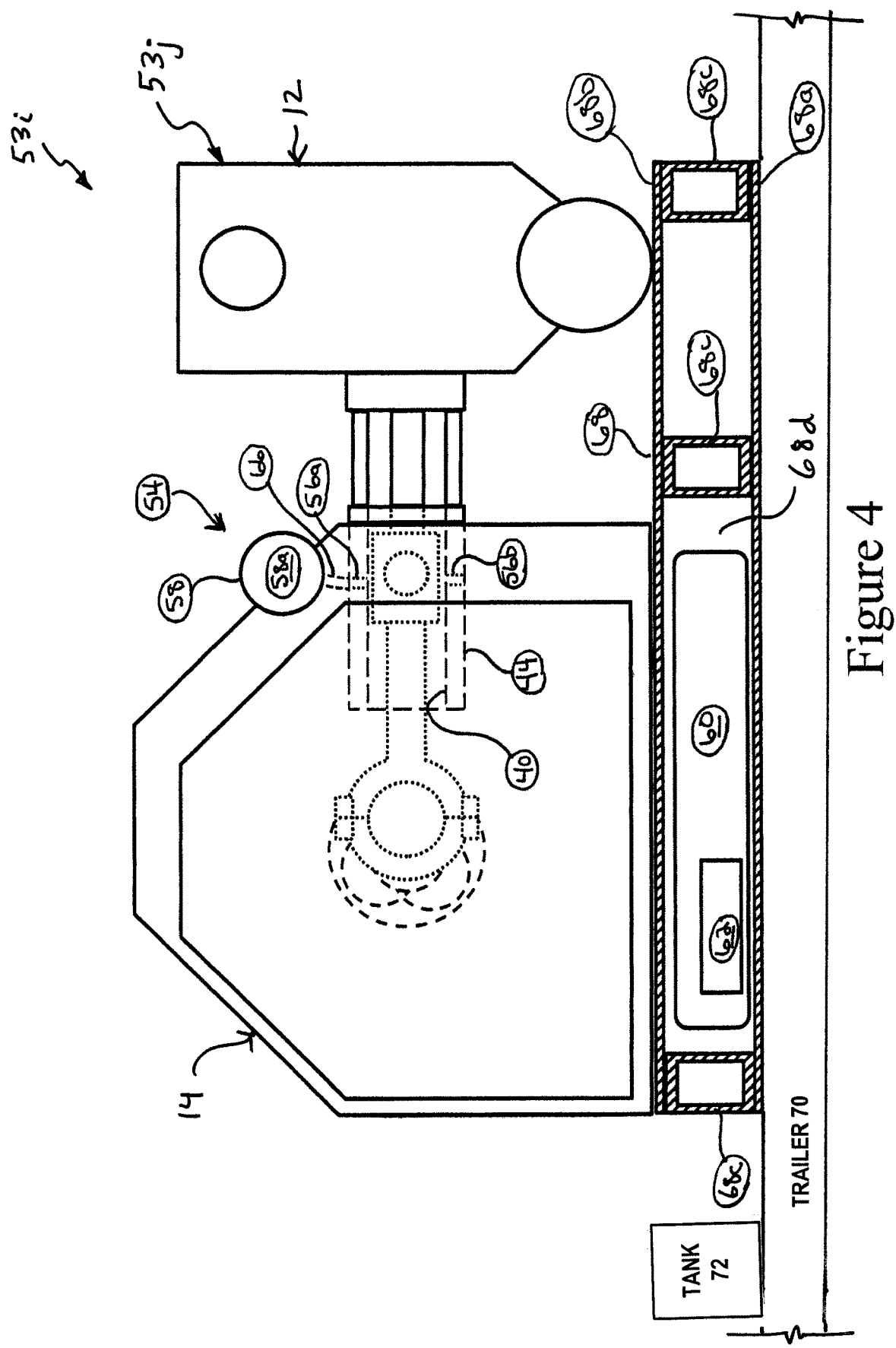
FIG. 4 is a diagrammatic side view of an apparatus that includes a reciprocating pump assembly, including a power end and a fluid end, the reciprocating pump assembly being mounted on a skid, the power end including an integrated lubrication system that includes a tank, a pump, and a manifold, according to an embodiment.
Figure 5:
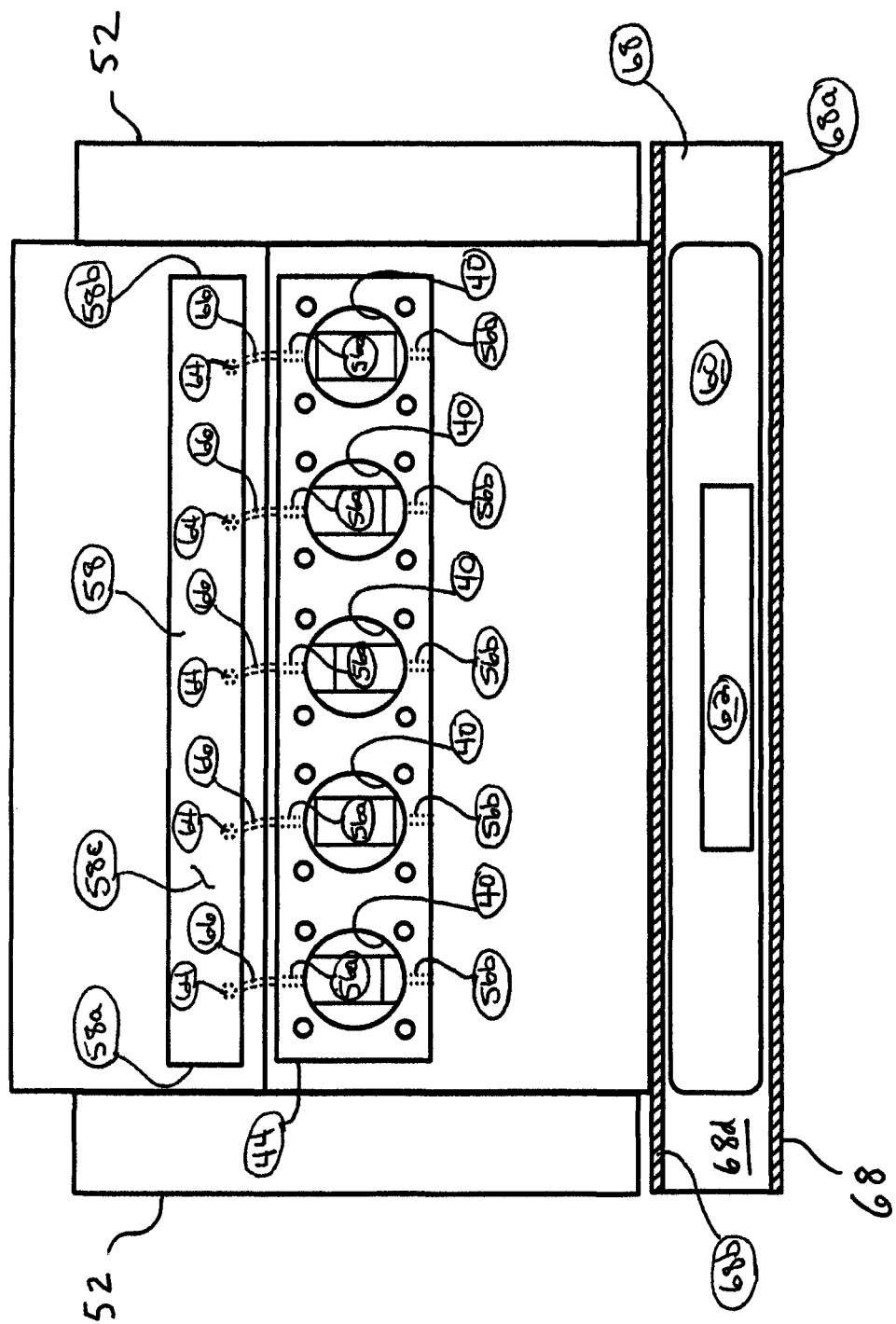
FIG. 5 is a diagrammatic front view of the power end of FIG. 4, the power end being disposed on the skid of FIG. 4 and including the integrated lubrication system, according to an embodiment.
Figure 6:
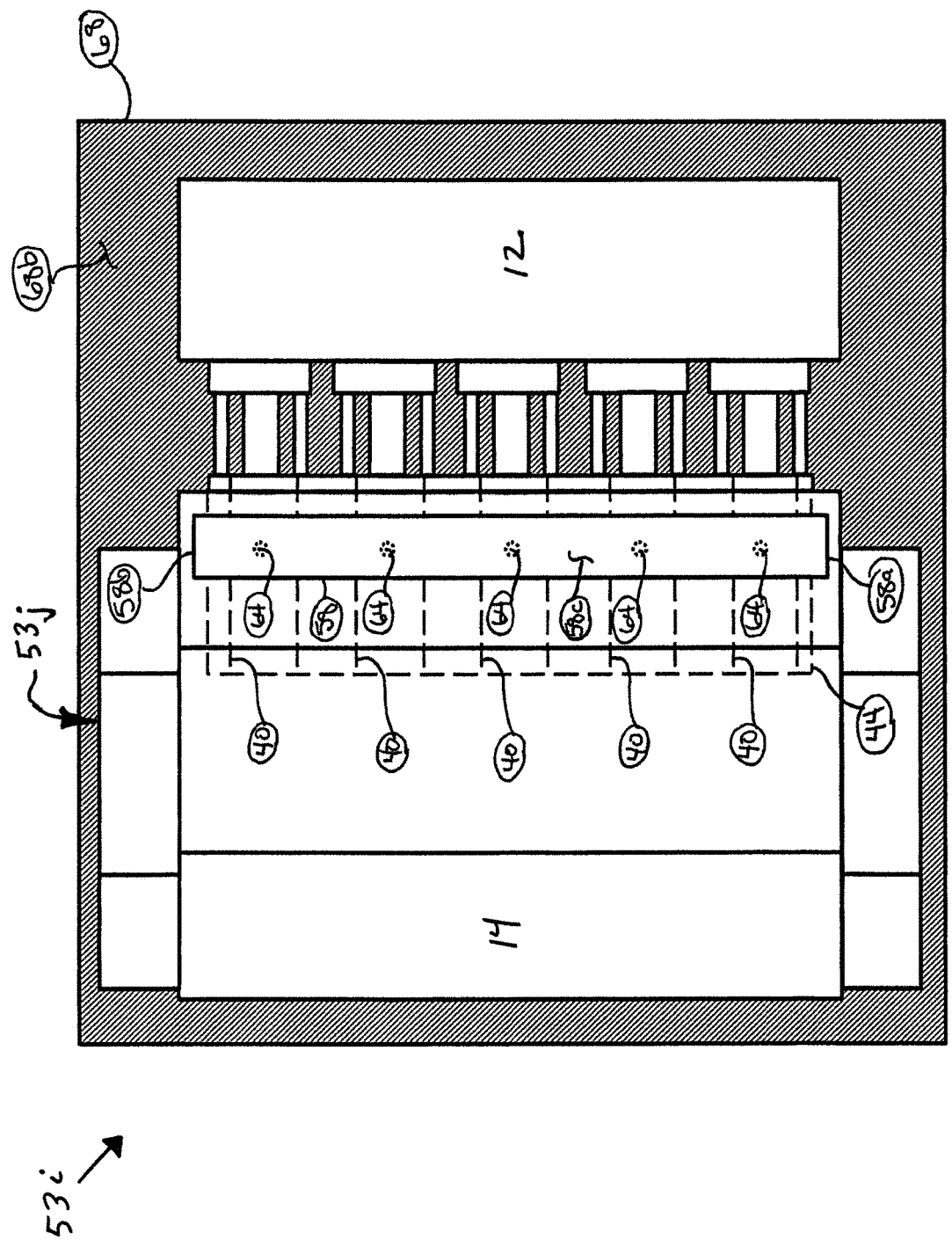
FIG. 6 is a diagrammatic top view of the apparatus of FIG. 4, including the reciprocating pump assembly of FIGS. 1 and 2 being disposed on the skid of FIGS. 4 and 5, the power end including the integrated lubrication system, according to an embodiment.

In an embodiment, as illustrated in FIGS. 4-6 with continuing reference to FIGS. 1-3, an apparatus is generally referred to by the reference numeral 53i. The apparatus 53i includes a reciprocating pump assembly 53j, which is similar to the reciprocating pump assembly 10 and includes components that are identical, or substantially similar, to the components of the reciprocating pump assembly 10; these identical or substantially similar components will be given the same reference numerals.

As shown in FIGS. 4-6, the reciprocating pump assembly 53j further includes an external, self-contained, and integrated lubrication system 54, which is adapted to deliver a lubrication fluid to respective ones of the crosshead bores 40, thereby lubricating the crossheads 36 as they reciprocate within the crosshead block 44. Accordingly, a plurality of lubrication ports 56a are formed through the top of the crosshead block 44 and into respective ones of the crosshead bores 40. Further, a corresponding plurality of drain ports 56b are formed through the bottom of the crosshead block 44 and into respective ones of the crosshead bores 40. The lubrication system 54 includes a manifold 58, a tank 60, and a pump 62, each of which is external to the power end 14. The manifold 58 is a generally tubular vessel including opposing end caps 58a and 58b, and defining a fluid chamber 58c. The manifold 58 is disposed above the crosshead block 44 and extends across the power end 14. The tank 60 stores the lubrication fluid for eventual circulation to the fluid chamber 58c of the manifold 58. The pump 62 is in fluid communication with both the tank 60 and the manifold 58, and is operable to pump the lubrication fluid from the tank 60 to the fluid chamber 58c of the manifold 58 via a fluid transfer line 63 (shown in FIG. 7). The manifold 58 is connected to, and supported by, the power frame 42. In some embodiments, the rib plates 42a each include a bracket (not shown) that supports at least a portion of the manifold 58. The brackets of the respective rib plates 42a are substantially aligned with one another, thus supporting the manifold 58 in a fixed position relative to the crosshead block 44 and the respective crosshead bores 40. In some embodiments, the manifold 58 is connected to, and supported by, the crosshead block 44 and/or the power frame 42.

The manifold 58 includes a plurality of lubrication ports 64, each corresponding to, and aligned with, the respective lubrication ports 56a of the crosshead block 44. A plurality of lubrication lines 66 connect the lubrication ports 64 of the manifold 58 to the respective lubrication ports 56a of the crosshead block 44. As a result, the lubrication lines 66 provide fluid communication between the fluid chamber 58c of the manifold 58 and the respective crosshead bores 40 of the crosshead block 44. A fluid return line 67a (shown in FIG. 7) is connected between the drain ports 56b, which are formed through the crosshead block 44 and into the crosshead bores 40, and the tank 60. The fluid return line 67a thus provides fluid communication between the crosshead bores 40 and the tank 60.

Figure 7:
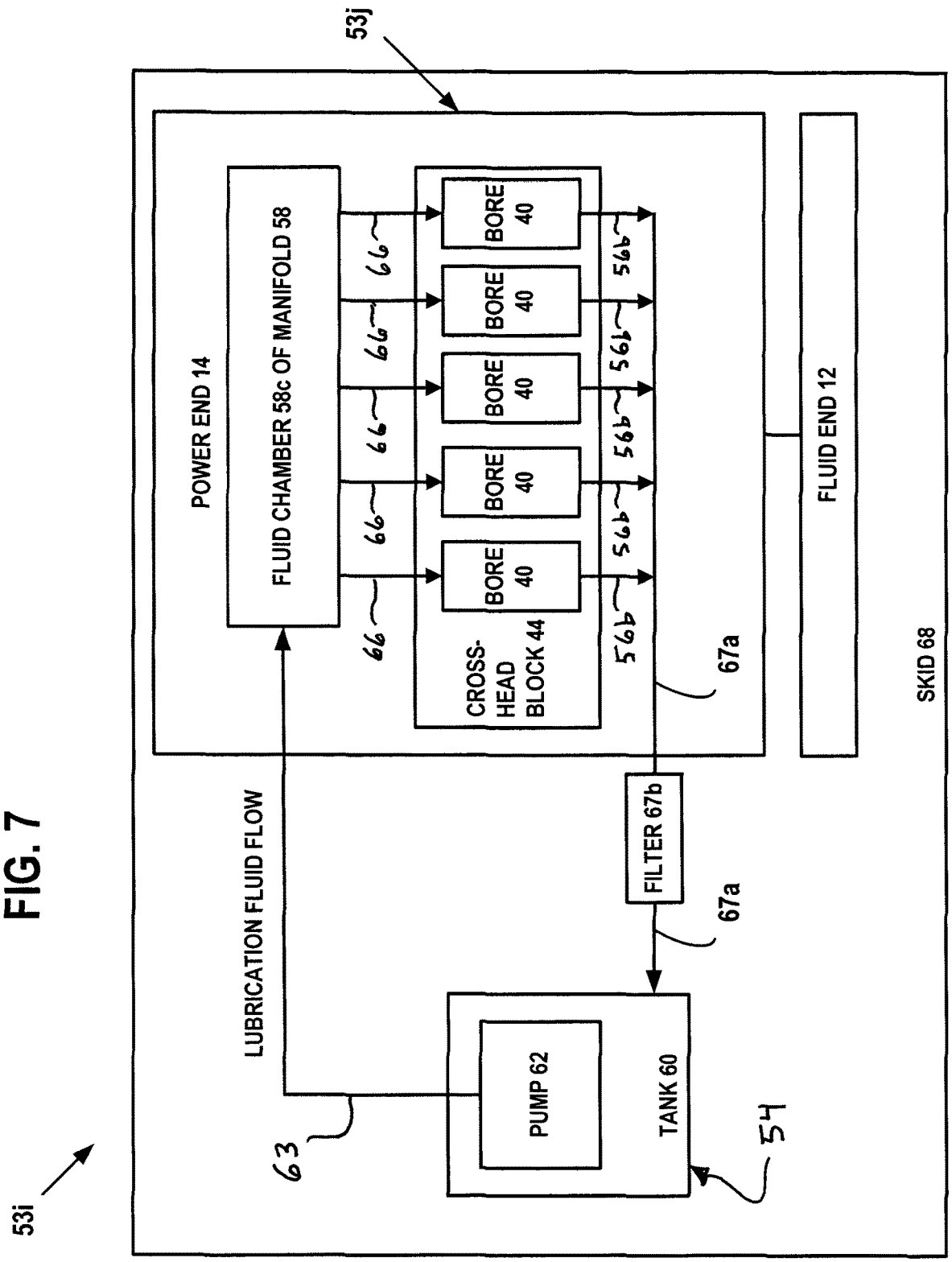
FIG. 7 is a diagrammatic illustration of the apparatus of FIG. 4, including the integrated lubrication system, according to an embodiment.

Referring to FIG. 7 with continuing reference to FIGS. 4-6, in operation, the tank 60 is filled with the lubrication fluid. The pump 62 subsequently pumps the lubrication fluid from the tank 60 to the fluid chamber 58c of the manifold 58 via the fluid transfer line 63. The lubrication fluid then passes through the lubrication ports 64 of the manifold 58. The lubrication lines 66 transfer the lubrication fluid from the lubrication ports 64 of the manifold 58 to the lubrication ports 56a of the crosshead block 44. The lubrication fluid is received by the respective crosshead bores 40 through the lubrication ports 56a, and the lubrication fluid lubricates the crossheads 36 as they reciprocate within the crosshead block 44. The lubrication fluid, along with any materials worn from the crossheads 36 and/or the crosshead bores 40, passes through the drain ports 56b of the crosshead block 44. The lubrication fluid then drains through the fluid return line 67a, which includes a filter 67b, and back into the tank 60. In this manner, the lubrication fluid is circulated through the lubrication system 54 of the reciprocating pump assembly 53j. The filter 67b collects particles contained in the lubrication fluid circulated to the tank 60 from the crosshead bores 40; for example, such particles may include materials worn from the crossheads 36 and/or the crosshead bores 40. The fluid return line 67a, the tank 60, one or more other components of the integrated lubrication system 54, or any combination thereof, may include one or more other filters instead of, or in addition to, the filter 67b.

As shown in FIGS. 4-6, the reciprocating pump assembly 53j and the self-contained, integrated lubrication system 54 are mounted on, and transported via, a skid 68. The skid 68 includes a base member 68a, a platform member 68b, and a plurality of support members 68c that are connected to the base member 68a and the platform member 68b. The support members 68c are disposed between the base member 68a and the platform member 68b. The reciprocating pump assembly 53j is positioned on top of the platform member 68b, which is supported from beneath by the support members 68c. The support members 68c are positioned on top of the base member 68a. A region 68d is thus defined between the base member 68a, the platform member 68b and two or more of the support members 68c. Although one embodiment of the skid 68 has been described above, in some embodiments the skid 68 may take the form of any raised platform upon which the reciprocating pump assembly 53j is supported, and beneath which a region is defined. In some embodiments, the reciprocating pump assembly 53j and the integrated lubrication system 54 may be positioned on top of the platform member 68b; in some embodiments, the skid 68 may not include one or more of the base member 68a and the support members 68c.

With continuing reference to FIGS. 4-6, the tank 60 is disposed within the region 68d. Further, the pump 62 is disposed within the tank 60, and is thus at least partially submerged in the lubrication fluid. In other embodiments, the tank 60 may instead be disposed within another region defined beneath the platform member 68b or another platform that supports the reciprocating pump assembly 53j. In some embodiments, rather than being disposed within the tank 60, the pump 62 may instead be disposed adjacent the tank 60. Accordingly, the pump 62 may be disposed within the region 68d or within another region defined beneath the platform member 68b or another platform that supports the reciprocating pump assembly 53j. In some embodiments, neither the tank 60 nor the pump 62 is disposed within the region 68d, or within any other region defined beneath the platform member 68b or any other platform that supports the reciprocating pump assembly 53j. In some embodiments, the tank 60 and the pump 62 are disposed adjacent the reciprocating pump assembly 53j.

In some embodiments, the lubrication system 54 is mounted on the skid 68 and thus the components of the lubrication system 54, including the tank 60, are separate from, or independent of, any trailer on which the skid 68 may be mounted and/or transported, such as a trailer 70, which is shown in FIG. 4 and on which the apparatus 53i is mounted. As a result, the operation of the lubrication system 54 is not dependent upon any pump lubrication feature of any trailer on which the skid 68 may be mounted and/or transported, such as fluid reservoirs or tanks containing lubricant or lubrication fluid, such as a tank 72, which is shown mounted on the trailer 70 in FIG. 4. In some embodiments, since the reciprocating pump assembly 53j and the lubrication system 54 are both mounted on the skid 68, the apparatus 53i may be transported by simply transporting the skid 68. In some embodiments, since at least the tank 60 and the pump 62 are external to the power end 14, rather than being internal to the power end 14, at least the tank and the pump 62 may be serviced and/or replaced without any interference to the power end 14.

In some embodiments, while different steps, processes, and procedures are described as appearing as distinct acts, one or more of the steps, one or more of the processes, and/or one or more of the procedures may also be performed in different orders, simultaneously and/or sequentially. In some embodiments, the steps, processes and/or procedures may be merged into one or more steps, processes and/or procedures.

In some embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

Although several embodiments have been described in detail above, the embodiments described are not limiting, and those skilled in the art will readily appreciate that many other modifications, changes, and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6, for any limitations of any of the claims herein, except for those in which the claim expressly uses the word "means" together with an associated function.

What is claimed is:

1. An apparatus, comprising:
   a power end of a reciprocating pump assembly, the power end comprising:
      a crosshead block formed of a solitary integral mass and having a plurality of bores therethrough, at least one bore of the plurality of bores having a lubrication port and a drain port therein;
      a manifold in fluid communication with the lubrication port;
      a pump in fluid communication with the manifold,
         wherein the pump is operable to pump a lubrication fluid to the crosshead block, via the manifold, and
         wherein the lubrication port is configured to pass the lubrication fluid into the bore so that a crosshead disposed within the bore is lubricated as it reciprocates within the bore.

2. The apparatus of claim 1, wherein the power end is adapted to be mounted to a skid, the skid being adapted to be mounted and/or transported on a trailer.

3. The apparatus of claim 2, further comprising a tank in fluid communication with the drain port and the pump, the tank and the pump being external to the power end.

4. The apparatus of claim 3, wherein the drain port is in fluid communication with the tank to permit the lubrication fluid to drain back into the tank.

5. The apparatus of claim 4, further comprising a fluid return line via which the lubrication fluid drains back from the drain port into the tank, the fluid return line further comprising a filter positioned external to the power end.

6. The apparatus of claim 3, wherein the skid comprises:
   a base member and a platform member spaced therefrom; and
   a region defined between the base member and the platform member,
      wherein the power end is mounted on the platform member, and
      wherein the tank and the pump are disposed in the region.

7. The apparatus of claim 3, wherein the pump is contained within the tank.

8. The apparatus of claim 3, wherein the crosshead block comprises additional bores, each bore having a lubrication port and a drain port, each lubrication port being in fluid communication with the manifold, and each drain port being in fluid communication with the tank.

9. The apparatus of claim 2, further comprising a reciprocating pump assembly mounted on the skid, the reciprocating pump assembly comprising the power end and a fluid end operably coupled thereto.

10. The apparatus of claim 1, wherein the manifold defines a fluid chamber in fluid communication with the pump, and also in fluid communication with the bore via the lubrication port.

11. The apparatus of claim 1, wherein the power end further comprises a power frame, the power frame comprising a plurality of rib plates, each of the rib plates comprising a brace portion defining a contact surface;
wherein the contact surfaces of the brace portions engage the crosshead block.

12. An apparatus, comprising:
a power end of a reciprocating pump assembly, the power end comprising:
a power frame comprising a plurality of rib plates in spaced relation, each rib plate comprising a brace portion that includes a contact surface; and
a crosshead block,
wherein the crosshead block is engaged by respective contact surfaces of the brace portions of the plurality of rib plates.

13. The apparatus of claim 12, wherein the crosshead block is formed of an integral mass, wherein each of the rib plates is not cast, and wherein each of the rib plates is fabricated.

14. The apparatus of claim 13, wherein each of the rib plates is fabricated by cutting, assembling, welding, or bending.

15. The apparatus of claim 12, wherein the power end further comprises:
a power housing connected to the power frame;
a first gear cover and a second gear cover connected to respective opposing sides of the power housing, wherein the first gear cover and the second gear cover are stamped or hydroformed.

16. The apparatus of claim 12, wherein each of the rib plates comprises a plurality of openings formed therethrough;
wherein the respective pluralities of openings are aligned with each other;
wherein the power frame further comprises a support rod connected to each of the rib plates; and
wherein the support rod extends through corresponding ones of the aligned openings formed through the rib plates.

17. The apparatus of claim 16, wherein the power end further comprises a crankshaft that extends through the plurality of rib plates and is adapted to rotate;
wherein each of the rib plates comprises a central opening, wherein the central opening defines, or is part of, a rotational bearing that is adapted to support the crankshaft during rotation thereof.

18. The apparatus of claim 12, wherein the respective contact surfaces of the brace portions are coplanar, and wherein the crosshead block engages each of the coplanar contact surfaces.

19. The apparatus of claim 12, further comprising:
a skid, the power end being mounted on the skid;
a fluid end mounted on the skid and operably coupled to the power end;
a tank mounted on the skid and in fluid communication with a plurality of bores of the crosshead block; and
a pump mounted on the skid and in fluid communication with the tank and each of the plurality of bores of the crosshead block,
wherein the pump is operable to pump lubrication fluid from the tank and into each of the plurality of bores of the crosshead block.

20. A crosshead block of a power end of a reciprocating pump assembly, the crosshead block comprising:
a solitary integral mass defining:
a plurality of crosshead bores formed therethrough;
a plurality of lubrication ports formed through a first side of the crosshead block and into respective ones of the plurality of crosshead bores; and
a plurality of drain ports formed through a second opposite side of the crosshead block and into respective ones of the plurality of crosshead bores,
wherein a lubrication fluid is configured to pass through, in series, the plurality of lubrication ports, the plurality of crosshead bores, and the plurality of drain ports, and
wherein during operation, the lubrication fluid is configured to lubricate a plurality of crossheads reciprocating within respective ones of the crosshead bores.

* * * * *